United States Patent
Nagae et al.

(10) Patent No.: US 7,145,264 B2
(45) Date of Patent: *Dec. 5, 2006

(54) ELECTRONIC AUTOMOBILE ANTI-THEFT APPARATUS

(75) Inventors: Toshihiro Nagae, Aichi (JP); Masaki Yoshino, Aichi (JP); Masaki Hayashi, Aichi (JP); Hirokazu Shamoto, Aichi (JP); Shoichi Harada, Aichi (JP); Shinji Kishida, Toyota (JP); Koji Iwamoto, Toyota (JP); Toshio Asahi, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 192 days.

This patent is subject to a terminal disclaimer.

(21) Appl. No.: 10/265,048

(22) Filed: Oct. 4, 2002

(65) Prior Publication Data

US 2003/0067216 A1 Apr. 10, 2003

(30) Foreign Application Priority Data

Oct. 4, 2001 (JP) .............................. 2001-308845

(51) Int. Cl.
*B60R 25/00* (2006.01)
(52) U.S. Cl. ................................... 307/10.2
(58) Field of Classification Search ............... 307/9.1, 307/10.1, 10.2, 10.3; 70/186, 252
See application file for complete search history.

(56) References Cited

U.S. PATENT DOCUMENTS

| | | | | |
|---|---|---|---|---|
| 3,782,493 A | * | 1/1974 | Lipschutz et al. | 180/287 |
| 4,250,976 A | * | 2/1981 | Mochida | 180/271 |
| 4,332,306 A | * | 6/1982 | Turatti | 180/287 |
| 4,643,009 A |  | 2/1987 | Sato | |
| 5,451,925 A | * | 9/1995 | Le | 340/426.11 |
| 5,676,000 A | * | 10/1997 | Chen | 70/209 |
| 5,952,937 A | * | 9/1999 | Koopman et al. | 340/825.72 |
| 6,107,694 A | * | 8/2000 | Mostrom | 307/10.2 |
| 6,125,671 A | * | 10/2000 | Suzuki | 70/186 |
| 6,130,604 A | * | 10/2000 | Matsumoto et al. | 340/5.64 |
| 6,414,586 B1 | * | 7/2002 | Yoshizawa | 340/5.2 |
| 6,433,675 B1 | * | 8/2002 | Suda et al. | 340/426.11 |
| 6,479,908 B1 | * | 11/2002 | Utter et al. | 307/10.3 |
| 2001/0050511 A1 | * | 12/2001 | Kochouh | 307/10.2 |
| 2002/0067078 A1 | * | 6/2002 | Hogarth | 307/10.2 |
| 2002/0175566 A1 | * | 11/2002 | Allen et al. | 307/10.3 |
| 2004/0012261 A1 | * | 1/2004 | Albert | 307/10.2 |
| 2004/0027239 A1 | * | 2/2004 | Hayashi et al. | 340/5.61 |
| 2004/0090124 A1 | * | 5/2004 | Geber et al. | 307/10.3 |

FOREIGN PATENT DOCUMENTS

| | | | |
|---|---|---|---|
| DE | 10039090 A1 | * | 2/2002 |
| EP | 0 733 523 A1 | | 9/1996 |
| FR | 2 801 263 A1 | | 5/2001 |
| JP | 59-14559 A | | 1/1984 |
| JP | 10-138870 A | | 5/1998 |

* cited by examiner

*Primary Examiner*—Robert L. Deberadinis
(74) *Attorney, Agent, or Firm*—Crompton, Seager & Tufte, LLC

(57) ABSTRACT

An electronic automobile anti-theft apparatus having high reliability includes a motor, which moves a lock pin to lock a steering shaft of an automobile. A solenoid maintains the lock pin in a state released from the steering shaft and operates to permit the lock pin to lock the steering shaft by receiving power. An ECU controls the operations of the motor and the solenoid. A mechanical switch stops supplying the solenoid with power to prevent unintentional locking by the lock pin when the automobile is being driven or when driving of the automobile is enabled.

14 Claims, 10 Drawing Sheets

Fig.7
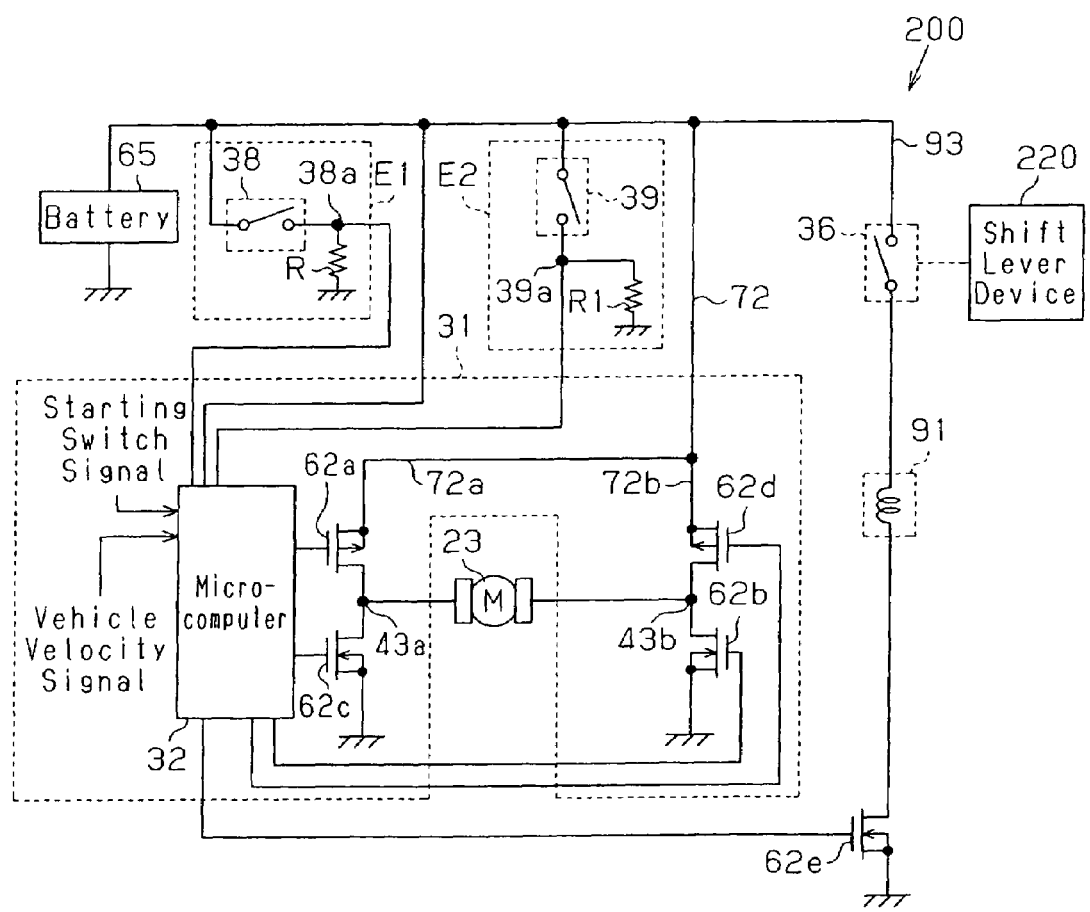
Fig.8(a) Fig.8(b)
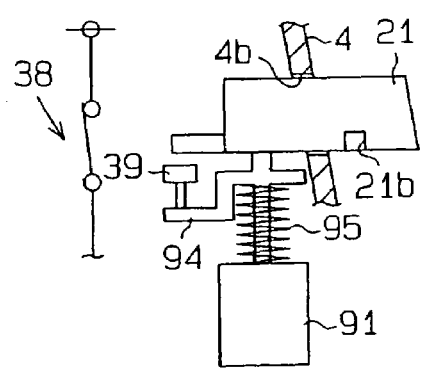 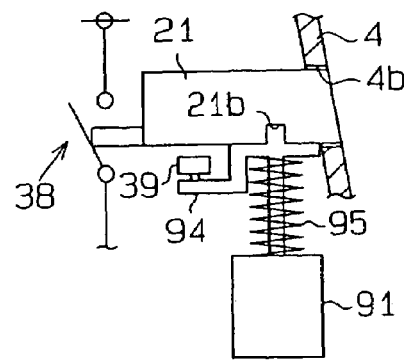

ELECTRONIC AUTOMOBILE ANTI-THEFT APPARATUS

BACKGROUND OF THE INVENTION

The present invention relates to an electronic automobile anti-theft apparatus.

A mechanical steering wheel lock is widely used in the prior art to prevent automobile theft. FIG. 1 shows an example of a steering lock 51, which includes a key cylinder 54 and a lock pin 52. A key (not shown) is inserted in the key cylinder 54 and rotated to actuate the lock pin 52 so that the lock pin 52 engages a steering shaft 53. This prohibits the rotation of the steering shaft 53 and a steering wheel (not shown).

Electronic key systems have recently become popular. An electronic key system starts an engine without using a key. Accordingly, there is a demand for an electronic automobile anti-theft apparatus, such as an electronic steering wheel lock that locks a steering wheel with an actuator (e.g., motor).

However, when employing an electronic steering wheel lock, electric noise may cause an electronic control unit (ECU) to actuate a motor, which actuates a lock pin, and lock the steering shaft with the lock pin in an unintentional manner. To solve this problem, a solenoid 103 may be employed, as shown in FIG. 2, to lock the lock pin when the lock pin is disengaged from the steering shaft. The solenoid 103 is connected to an interlock power supply line 105 of an electronic steering wheel lock 101. The supply of power to the solenoid 103 is controlled by a FET 106, which is activated and inactivated in accordance with an activation signal provided from a microcomputer 104. That is, the lock pin is locked when the solenoid 103 is deactivated and unlocked when the solenoid 103 is activated.

The microcomputer 104 may provide the FET 106 and FETs 107a–107d with an unintentional activation signal when electric noise is produced. In such case, a motor 102 may be actuated and the solenoid 103 may be activated thereby unlocking the lock pin. This would engage the lock pin with the steering shaft. Accordingly, the electronic steering wheel lock 101 does not solve the above problem.

SUMMARY OF THE INVENTION

It is an object of the present invention to provide an electronic vehicle anti-theft apparatus having high reliability.

To achieve the above object, the present invention provides an electronic automobile anti-theft apparatus including a locking means for selectively locking a steering mechanism or a drive mechanism of an automobile. A first actuator operates the locking means. A second actuator maintains the locking means in a lock release state. The second actuator operates to permit locking with the locking means by receiving power. A control unit controls the operations of the first and second actuators. A breaking means stops the supply of power to the second actuator when the automobile is being driven or when driving of the automobile is enabled.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a circuit diagram of an electronic steering wheel lock according to a second embodiment of the present invention;

FIGS. 8(a) and 8(b) are schematic diagrams showing a lock pin employed in the electronic steering wheel lock of FIG. 7;

DETAILED DESCRIPTION OF THE PREFERRED EMBODIMENTS

Figure 1:
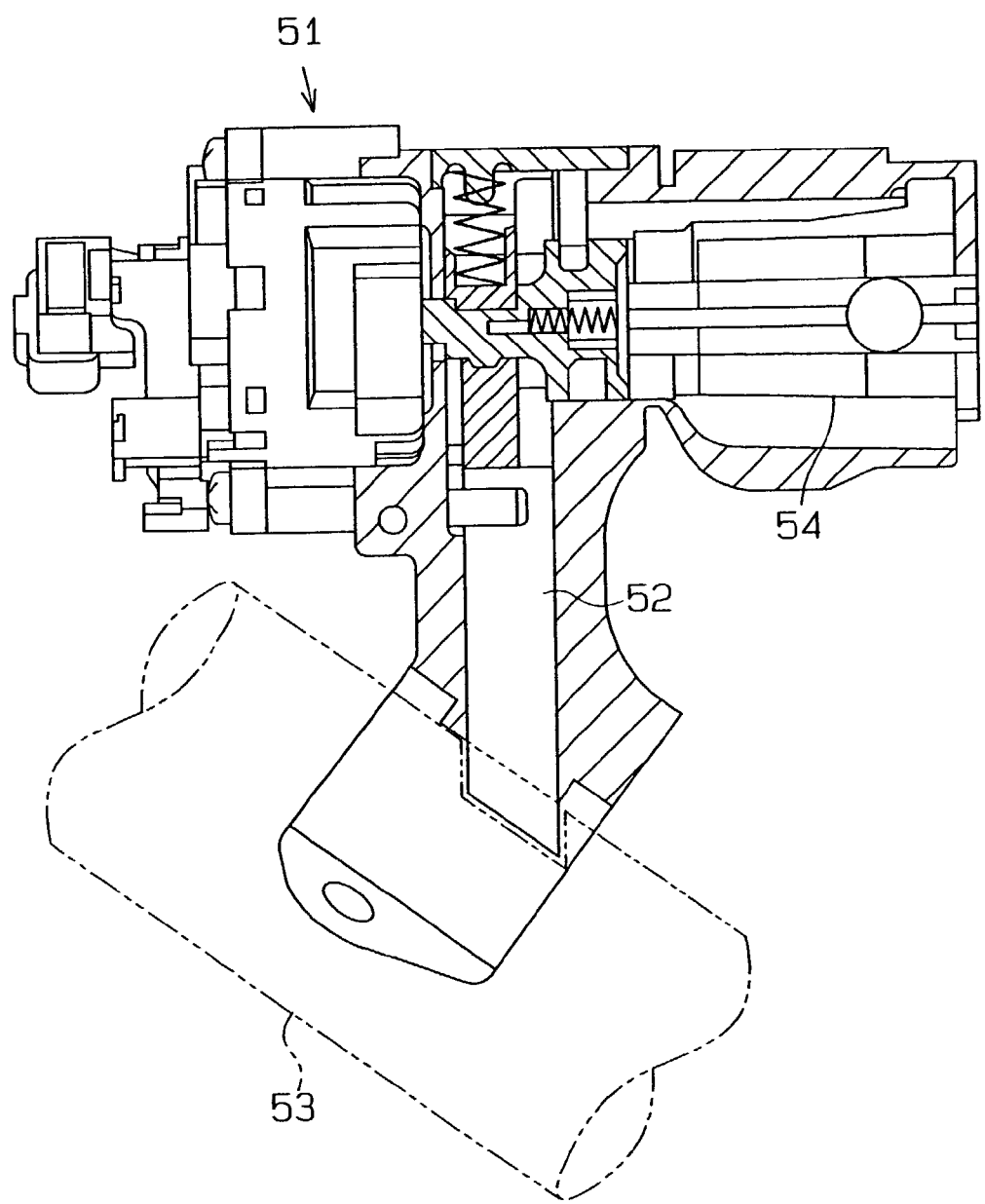
FIG. 1 is a cross-sectional view showing a prior art mechanical steering wheel lock.
Figure 2:
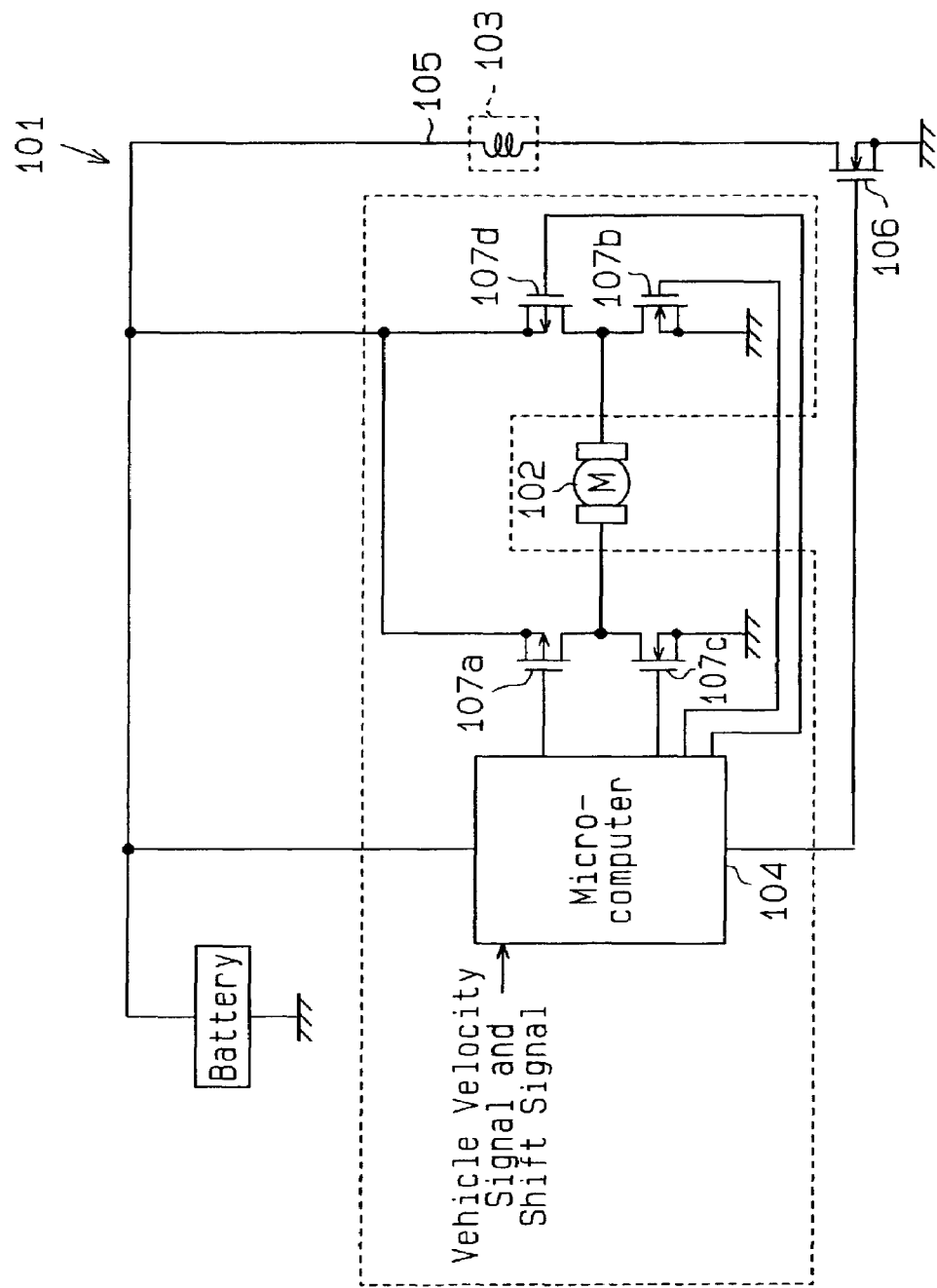
FIG. 2 is a circuit diagram of a prior art electronic steering wheel lock.

In the drawings, like numerals are used for like elements throughout.

Figure 3:
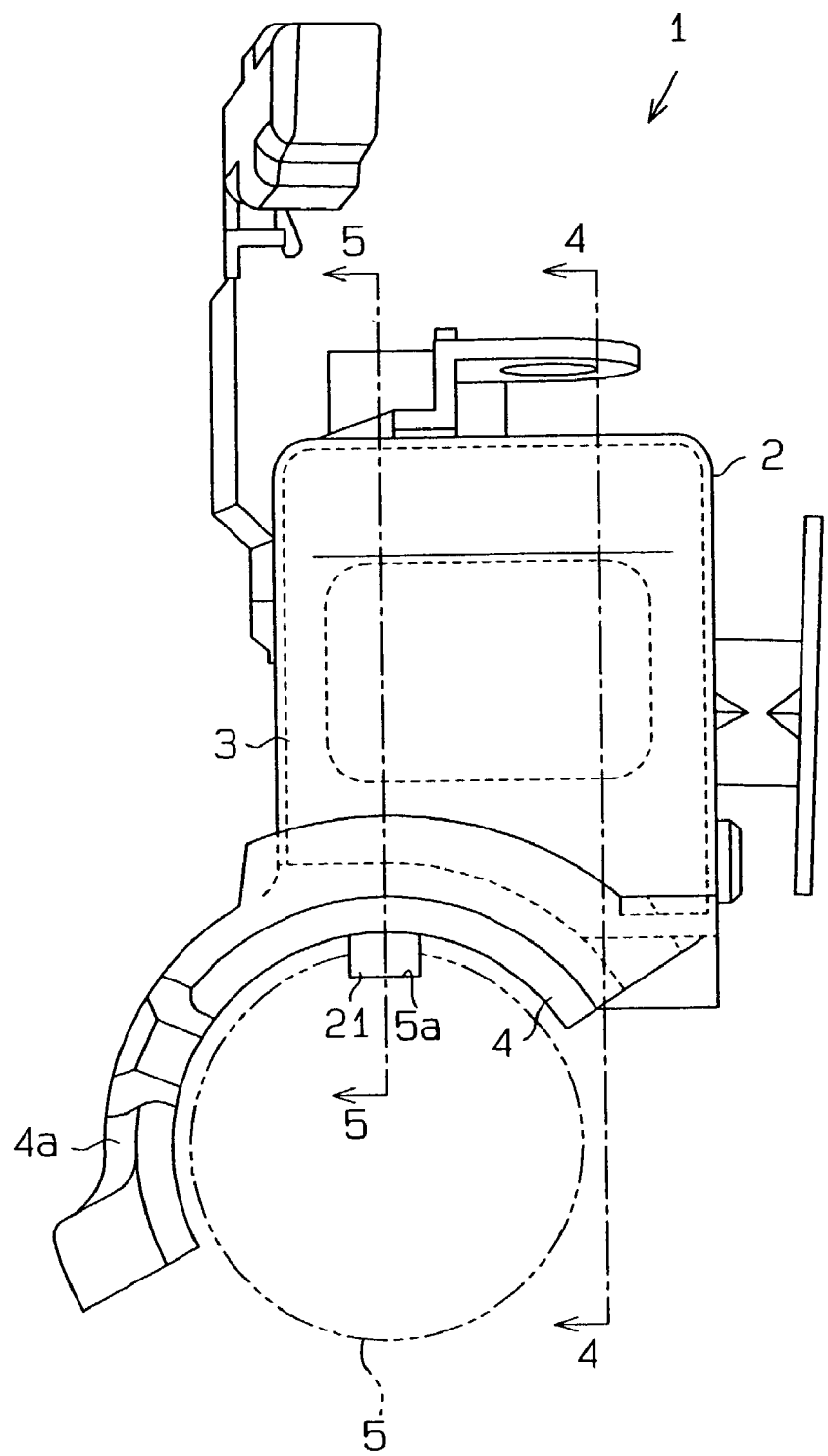
FIG. 3 is a side view of an electronic steering wheel lock according to a first embodiment of the present invention.

Referring to FIG. 3, an electronic steering wheel lock 1 according to a first embodiment of the present invention has a box-like case body 2. The case body 2 includes a lock body 4 and a cover 3, which is attached to the lock body 4. The electronic steering wheel lock 1 is installed in a steering post (not shown).

Figure 4:
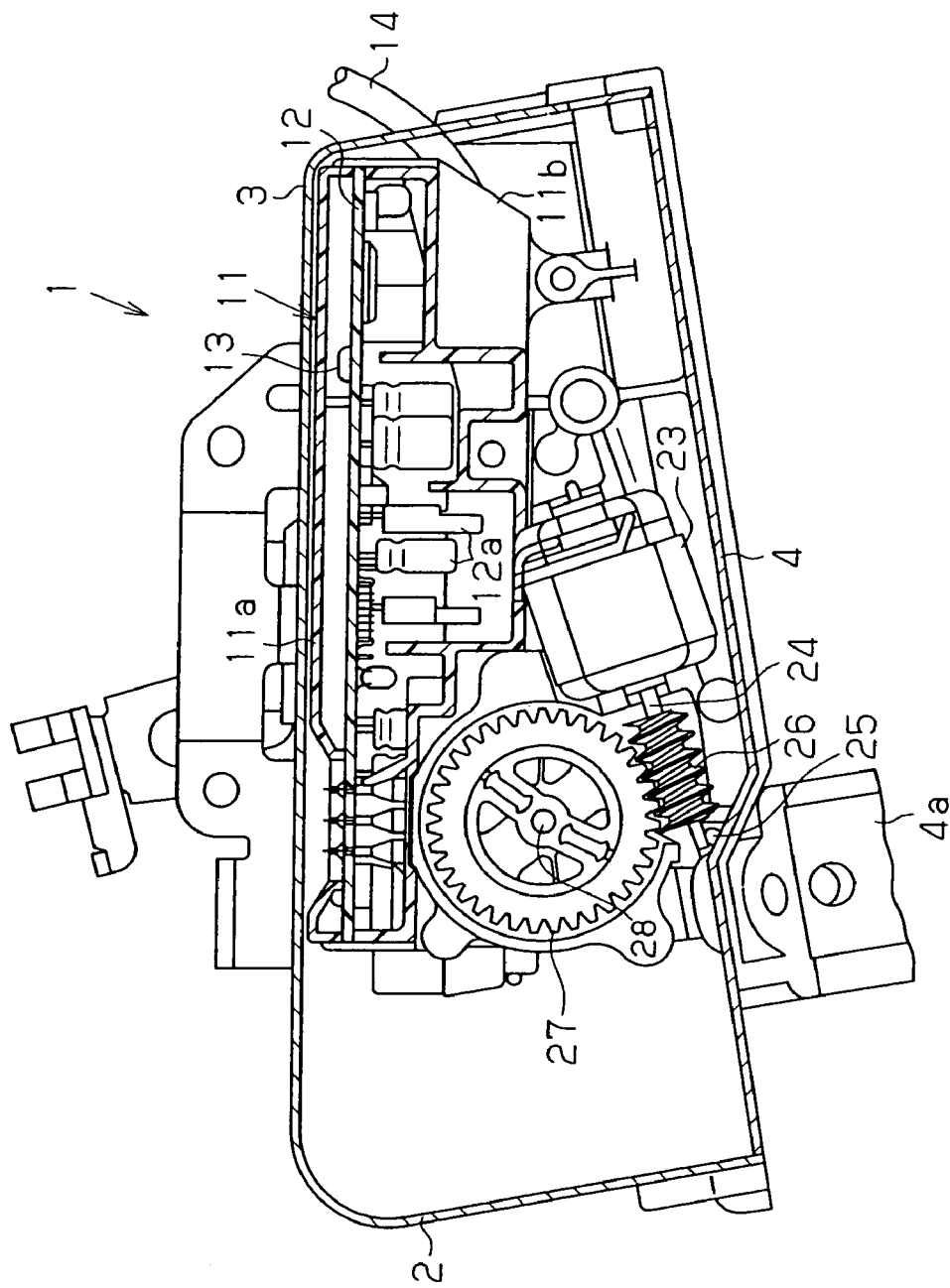
FIG. 4 is a cross-sectional view taken along line 4—4 in FIG. 3.
Figure 5:
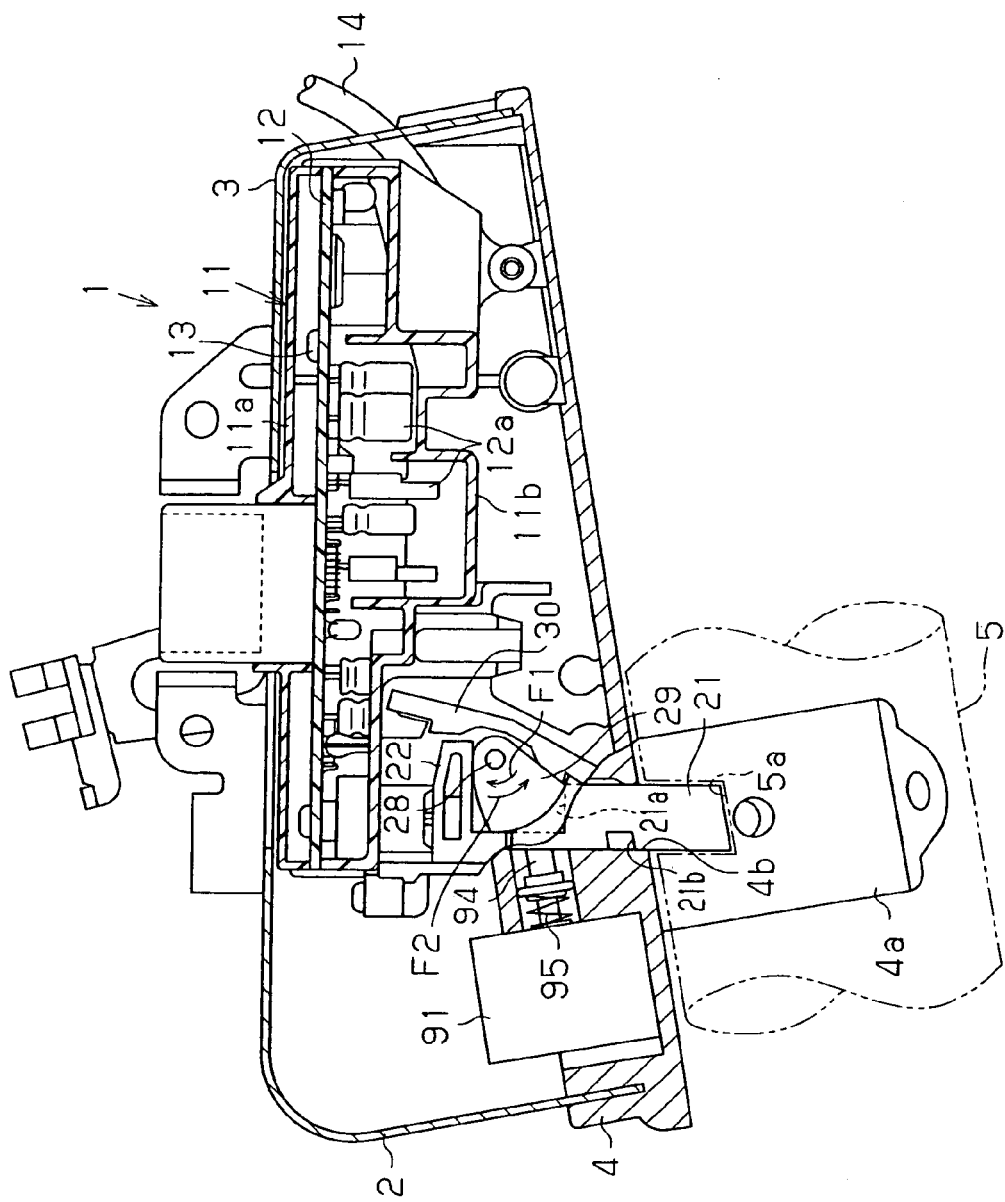
FIG. 5 is a cross-sectional view taken along line 5—5 in FIG. 3.

As shown in FIGS. 4 and 5, a retaining case 11, which is made of synthetic resin, is arranged in the cover 3. The retaining case 11 is formed by joining a first case 11a and a second case 11b. A printed circuit board 12 is retained in the retaining case 11. The printed circuit board 12 is fixed to the retaining case 11 by a screw 13. An electronic control unit (ECU) and electronic devices 12a, such as a capacitor, are connected to the printed circuit board 12. Further, an electric wire 14, which is electrically connected to the printed circuit board 12, extends outward from the retaining case 11.

As shown in FIG. 3, a generally arcuate coupling portion 4a extends from the lock body 4. The coupling portion 4a is coupled to a column tube (not shown) by a bolt (not shown). The column tube is inserted through a steering shaft 5.

A slot 5a is formed in the outer surface of the steering shaft 5. As shown in FIG. 5, the lock body 4 has a guide hole 4b. The guide hole 4b is formed at a position corresponding to the coupling portion 4a. When the case body 2 is attached to the column tube, the guide hole 4b is communicated with the interior of the column tube.

As shown in FIG. 5, a movable lock pin 21, which serves as a locking means, is arranged in the guide hole 4b. A pushed portion 21a and a hook 22 are defined on the basal portion of the lock pin 21. An engaging groove 21b extends along the outer surface at the middle of the lock pin 21. The distal portion of the lock pin 21 projects from and retracts into to the lock body 4. The lock pin 21 resembles a square bar having a generally square cross-section. The cross-sectional area of the lock pin 21 is smaller than the cross-sectional area of the guide hole 4b. The distal portion of the lock pin 21 may be engaged with and disengaged from the slot 5a.

As shown in FIG. 4, a motor 23 is accommodated in the case body 2. The motor 23 has a first shaft 24. The distal portion of the first shaft 24 contacts a slide pin 25, which functions to position the first shaft 24. A worm gear 26 is arranged on the first shaft 24. The worm gear 26 is meshed with a spur gear 27, which is arranged on a second shaft, to drive the spur gear 27. The spur gear 27 rotates about the second shaft 28.

As shown in FIG. 5, a triangular cam 29 is attached to the second shaft 28. When the motor 23 rotates the first shaft 24 in a forward direction, the cam 29 rotates about the second shaft 28 in a clockwise direction (the direction indicated by arrow F1). When the motor 23 rotates the first shaft 24 in a reverse direction, the cam 29 rotates about the second shaft 28 in a counterclockwise direction (the direction indicated by arrow F2). That is, the cam 29 rotates in the same direction as the spur gear 27. When the cam 29 rotates in the direction of arrow F1, the cam 29 pushes the hook 22 and disengages the distal portion of the lock pin 21 from the slot 5a. When the cam 29 rotates in the direction of arrow F2, the cam 29 pushes-the pushed portion 21a and engages the distal portion of the lock pin 21 with the slot 5a. The rotation of the cam 29 in the direction of arrow F2 is restricted when the cam 29 comes into contact with a rubber stopper 30.

Figure 6:
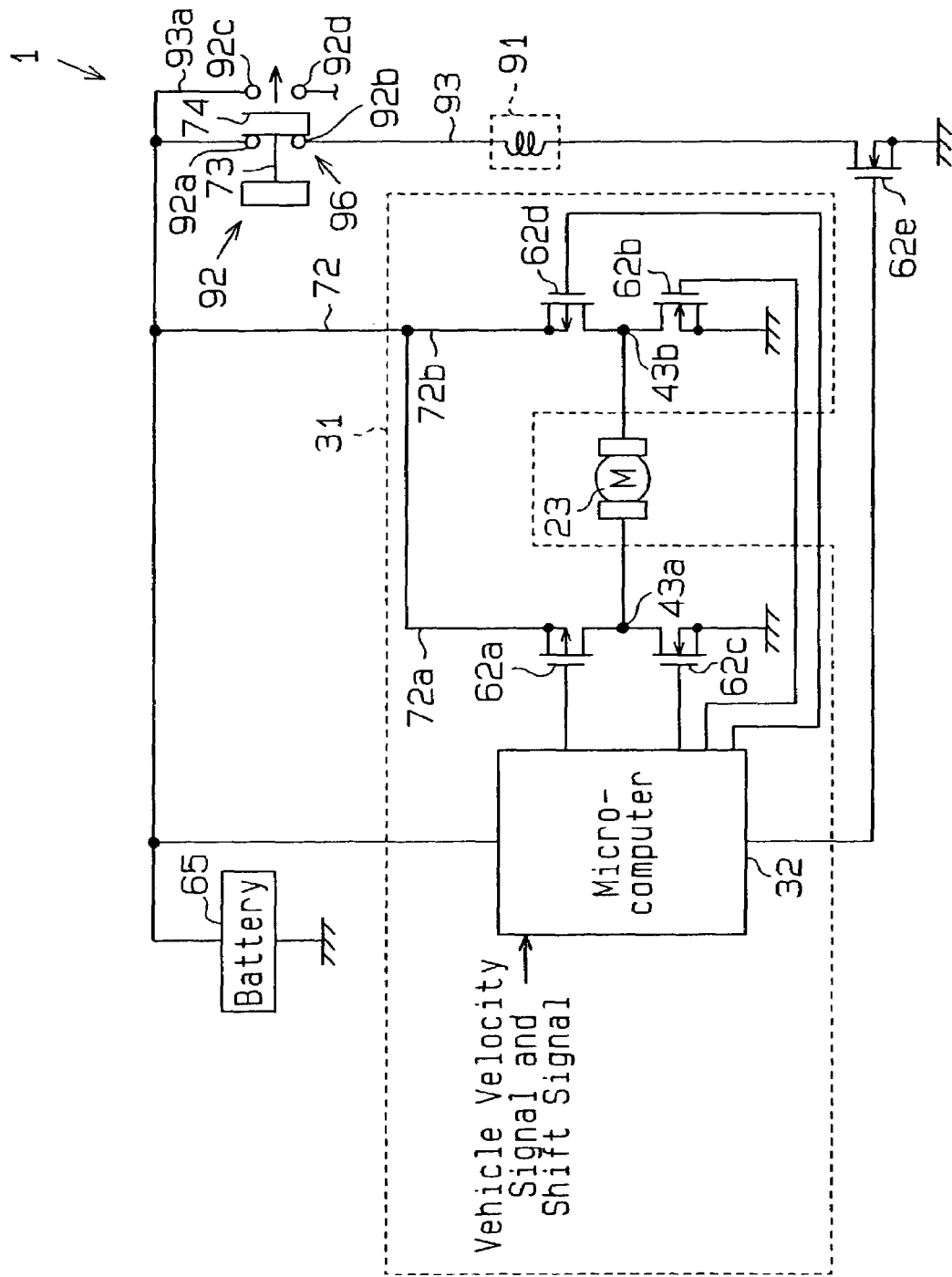
FIG. 6 is a circuit diagram of the electronic steering wheel lock of FIG. 3.

As shown in FIG. 5, a solenoid 91 is accommodated in the case body 2. The solenoid 91 includes a plunger 94 and a spring 95. The plunger 94 moves in a direction into the solenoid 91 when the solenoid 91 is activated. Further, the plunger 94 moves in a direction out of the solenoid 91 and engages the side surface of the lock pin 21 when the solenoid 91 is deactivated. When the lock pin 21 is disengaged from the slot 5a, the plunger 94 is permitted to engage and disengage the engaging groove 21b of the lock pin 21. The spring 95 urges the plunger 94 toward the lock pin 21. Referring to FIG. 6, an ECU 31 controls the motor 23 and the solenoid 91.

As shown in FIG. 6, the ECU 31 has a FET 62a and a FET 62d, which sources are connected to a battery 65 by a power supply line 72. The gate of the FET 62a is connected to a microcomputer 32. The drain of the FET 62a is connected to the drain of a FET 62c. The gate of the FET 62c is connected to the microcomputer 32, and the source of the FET 62c is grounded. The FET 62c is activated in response to an activation signal generated by the microcomputer 32 when the automobile engine is not running. The gate of the FET 62d is connected to the microcomputer 32. The drain of the FET 62d is connected to the drain of a FET 62b. The gate of the FET 62b is connected to the microcomputer 32, and the source of the FET 62b is grounded. A node 43a between the FET 62a and the FET 62c and a node 43b between the FET 62d and the FET 62b are connected to the motor 23. The FETs 62a, 62b, 62c, 62d and the motor 23 configure a full bridge.

The microcomputer 32, which is electrically connected to the battery 65, performs various processes. More specifically, the microcomputer 32 provides the FETs 62a, 62b with an activation signal and activates the FETs 62a, 62b when an ID code transmitted from a portable device, which is held by the driver, coincides with an ID code, which is stored in the microcomputer 32. That is, the microcomputer 32 performs a process for activating a smart ignition apparatus.

The microcomputer 32 receives a vehicle velocity signal and a shift signal from a vehicle controller (not shown). When the vehicle velocity is not null, the microcomputer 32 does not provide the FETs 62c, 62d with the activation signal. The vehicle velocity is not null when the automobile is being driven or when the shift lever is located at a position other than the parking position. That is, the motor 23 is not actuated and the lock pin 21 is disengaged from the steering shaft 5 when the vehicle velocity is not null.

When the FETs 62a, 62b are activated, current flows from the first power supply line 72a to the motor 23, and the second shaft 28 rotates in the direction of arrow F1. That is, the motor 23 rotates in the forward direction and disengages the lock pin 21 from the steering shaft 5. When the FETs 62c, 62d are deactivated, current flows from a second power supply line 72b to the motor 23. Thus, the motor 23 rotates the first shaft 24 in the reverse direction and engages the lock pin 21 with the steering shaft 5.

As shown in FIG. 6, the battery 65 is electrically connected to the solenoid 91 by a switch 96. The mechanical switch 96 has a first contact 92a connected to the battery 65 and a second contact 92b connected to the solenoid 91. The mechanical switch 96 selectively breaks the interlock power supply line 93 in cooperation with an ignition switch 92.

The interlock power supply line 93 is broken when the lock pin 21 is disengaged from the slot 5a. In this state, the spring 95 urges the plunger 94 of the solenoid 91 toward the lock pin 21. This engages the plunger 94 with the engaging groove 21b. When the lock pin 21 is engaged with the slot 5a, current flows through the interlock power supply line 93, the plunger 94 is retracted in the solenoid 91, and the plunger 94 is disengaged from the engaging groove 21b. The solenoid 91 is connected to the drain of a FET 62e. The gate of the FET 62e is connected to the microcomputer 32, and the source of the FET 62e is grounded. To engage the lock pin 21 with the slot 5a, the FET 62e is activated in response to an activation signal provided from the microcomputer 32. This supplies the solenoid 91 with power through the interlock power supply line 93 and disengages the plunger 94 from the engaging groove 21b, The automobile driver uses the ignition switch 92 to start and stop the engine. When the ignition switch 92 is operated to start the engine, the mechanical switch 96 breaks the interlock power supply line 93 and stops providing power to the solenoid 91. The ignition switch 92 includes a rod 73 and a movable piece 74, which is connected to the rod 73. When the ignition switch 92 is operated, the movable piece 74 moves away from the first and second contacts 92a, 92b and breaks the interlock power supply line 93. Further, the movable piece 74 comes into contact with nodes 92c, 92d of an ignition power supply line 93a. As a result, current flows through the ignition power supply line 93a.

The operation of the electronic steering wheel lock 1 will now be discussed. The driver first operates an ignition switch 92 and holds the ignition switch 92 at a starting position. As a result, the mechanical switch 96 cooperates with the ignition switch 92 and breaks the interlock power supply line 93.

Then, the microcomputer 32 compares the ID code included in a transmission signal from the portable device with the ID code of the microcomputer 32. When the ID codes coincide with each other, the microcomputer 32 provides the FETs 62a, 62b with the activation signal to activate the FETs 62a, 62b. As a result, the motor 23 is supplied with power through the first power supply line 72a. The motor 23 rotates the first shaft 24 in the forward direction and disengages the lock pin 21 from the slot 5a. This permits rotation of the steering shaft 5 and the steering wheel. When the lock pin 21 is completely retracted in the guide hole 4b, the plunger 94 engages the engaging groove 21b and locks the lock pin 21. In this state, a starting motor (not shown) is activated to start the engine.

If, for example, electrical noise is produced when the engine is running, the microcomputer 32 may provide the FETs 62c–62e with the activation signal and activate the FETs 62c–62e. However, the mechanical switch 96 keeps the interlock power supply line 93 broken. In addition, the plunger 94 of the solenoid 91 is kept engaged with the engaging groove 21b of the lock pin 21. This prohibits the actuation of the motor 23 and prevents the lock pin 21 from engaging the slot 5a.

When the driver operates the ignition switch 92 and stops the engine, the ignition switch 92 is arranged at a parking position. In this state, the microcomputer 32 provides the FETs 62c–62e with the activation signal to activate the FETs 62c–62e. As a result, power is supplied through the second power supply line 72b and the interlock power supply line 93. This activates the solenoid 91 and disengages the plunger 94 from the engaging groove 21b. Further, the motor 23 rotates the first shaft 24 in the reverse direction and disengages the lock pin 21 from the slot 5a. Thus, the rotation of the steering shaft 5 and the steering wheel (not shown) are prohibited.

The advantages of the electronic steering wheel lock 1 of the first embodiment are described below.

(1) When the automobile is being driven, the mechanical switch 96 stops supplying the solenoid 91 with power through the interlock power supply line 93. Therefore, even if electric noise causes the activation signal to be provided to the FETs 62c, 62d, power is not supplied to the solenoid 91. This prohibits the activation of the solenoid 91. Thus, even if the motor 23 is actuated unintentionally, the lock pin 21 is prevented from engaging the steering shaft 5. This improves the reliability of the electronic steering wheel lock 1.

(2) When the starting of the engine is permitted, the mechanical switch 96, which cooperates with the ignition switch 92, breaks the interlock power supply line 93. Thus, an additional mechanism for breaking the interlock power supply line is not necessary, and the manufacturing cost of the electronic steering wheel lock 1 is not increased.

(3) The circuit for moving the plunger 94 of the solenoid 91 is relatively simple. Thus, the manufacturing cost of the electronic steering wheel lock 1 is not increased. Further, the solenoid 91 is activated by disengaging the plunger 94 from the lock pin 21. Thus, the power consumption of the electronic steering wheel lock is not increased.

(4) When the microcomputer 32 is receiving the vehicle velocity signal and the shift signal, the FETs 62c, 62d are not provided with the activation signal. Thus, the FETs 62c, 62d remain deactivated and the motor 23 is not driven. That is, when the automobile is being driven or when the shift lever is located at a position other than the parking position, the microcomputer 32 does not drive the motor 23. This prevents unintentional operations of the electronic steering wheel lock 1 when the automobile is being driven.

An electronic steering wheel lock 200 according to a second embodiment of the present invention will now be discussed with reference to FIGS. 7 and 8. The electronic steering wheel lock 200 includes a lock position detection circuit E1 and a lock release detection circuit E2. The lock position detection circuit E1 includes a lock position detection switch 38 and a resistor R. The lock position detection switch 38 is connected between the battery 65 and the microcomputer 32. The resistor R is connected between a node 38a, which is located between the lock position detection switch 38 and the microcomputer 32, and the ground.

Referring to FIGS. 8(a) and 8(b), the lock position detection switch 38, which is a normal close type mechanical switch, is arranged near the basal portion of the lock pin 21. In the second embodiment, a limit switch is used as the lock position detection switch 38. As shown in FIG. 8(a), the lock position detection switch 38 is closed when the lock pin 21 projects out of the guide hole 4b of the lock body 4. As shown in FIG. 8(b), the lock position detection switch 38 is opened when the lock pin 21 is retracted in the lock body 4. That is, the lock position detection switch 38 is closed when the lock pin 21 is engaged with the slot 5a of the steering shaft 5 and opened when the lock pin 21 is disengaged from the lock pin 21.

The microcomputer 32 receives the voltage at the node 38a. The voltage at the node 38a is set at a high level when the lock position detection switch 38 is closed and set at a low level when the lock position detection switch 38 is opened. Thus, the microcomputer 32 recognizes that the lock pin 21 has locked the steering shaft 5 when the voltage at the node 38a is high. When the voltage at the node 38a shifts from the low level to the high level (i.e., when the steering shaft 5 is locked), the microcomputer 32 stops providing the FETs 62a–62e with a control signal. That is, upon completion of the engagement between the lock pin 21 and the slot 5a, the microcomputer 32 stops providing the FETs 62c–62e with the control signal. Accordingly, the lock position detection circuit E1 functions to provide the microcomputer 32 with a motor stopping signal, which stops driving the motor 23, when the lock pin 21 locks the steering shaft 5.

The lock release detection circuit E2 includes a lock release detection switch 39 and a resistor R1. The lock release detection switch 39 is connected between the battery 65 and the microcomputer 32. The resistor R1 is connected to a node 39a between the lock release detection switch 39 and the microcomputer 32.

The lock release detection switch 39 is a normal close type mechanical switch and located in the vicinity of the plunger 94. In the second embodiment, a limit switch is used as the lock release detection switch 39. The lock release detection switch 39 is opened when the plunger 94 is disengaged from the engaging groove 21b, as shown in the state of FIG. 8(a), and closed when the plunger 94 is disengaged from the engaging groove 21b, as shown in the state of FIG. 8(b).

The microcomputer 32 receives the voltage at the node 39a. The voltage at the node 39a is set at a high level when the lock release detection switch 39 is closed and set at a low level when the lock release detection switch 39 is opened. Thus, the microcomputer 32 recognizes that the lock pin 21 has released the steering shaft 5 when the voltage at the node 39a is high and recognizes that the lock pin 21 is locking the steering shaft 5 when the voltage at the node 39a is low. When the voltage at the node 39a shifts from the low level to the high level (i.e., when the steering shaft 5 is unlocked), the microcomputer 32 stops providing the FETs 62a, 62b with a control signal. Accordingly, the lock release detection circuit E2 functions to provide the microcomputer 32 with a motor stopping signal for stopping the motor 23 when the steering shaft 5 is unlocked. Further, the lock release detection circuit E2 functions to provide the microcomputer 32 with a lock detection signal when the steering shaft 5 is locked.

The electronic steering wheel lock 200 of the second embodiment includes a shift lever switch 36, which is connected between the solenoid 91 and the battery 65. The shift lever switch 36, which functions in cooperation with a shift lever device 220, opens when a shift lever is located at a position other than the parking position. This breaks the interlock power supply line 93.

The shift lever switch 36, which is arranged in the vicinity of the shift level (not shown), opens and closes in cooperation with the movement of the shift level. The shift lever switch 36 closes when the shift lever is located at the parking position or when a parking lock of a transmission is functioning and opens when the shift lever is located at a position other than the parking position. The shift lever switch 36 is a contact type switch, such as a limit switch or a reed switch. A parking brake switch, which closes only when the parking brake is actuated, may be used in lieu of the shift lever switch 36. Alternatively, a parking brake switch may be connected in series with the shift lever switch 36.

The operation of the electronic steering wheel lock 200 will now be discussed. The driver first operates a starting switch (not shown) to enable the starting of the engine. The microcomputer 32 activates the FETs 62a, 62b and deactivates the FETs 62c, 62d when the ID code of the portable device coincides with the ID code of the microcomputer 32 and the shift lever switch 36 is opened (when the vehicle speed is null). As a result, the motor 23 disengages the lock pin 21 from the slot 5a and permits rotation of the steering shaft 5 and the steering wheel. When the lock pin 21 is retracted in the guide hole 4b and the plunger 94 engages the engaging groove 21b, as shown in the state of FIG. 8(b), the lock release detection switch 39 is activated and the microcomputer 32 is provided with the motor stopping signal that has a high level. In response to the motor stopping signal, the microcomputer 32 deactivates the FETs 62a, 62b. In this state, the starting motor (not shown) starts the engine.

If, for example, electrical noise is produced when the engine is running, the microcomputer 32 may provide the FETs 62c–62e with the activation signal and activate the FETs 62c–62e. However, the interlock power supply line 93 is broken by the shift lever switch 36. Thus, the plunger of the solenoid 91 remains engaged with the engaging groove 21b. Accordingly, the motor 23 is not actuated, and the lock pin 21 is prevented from engaging the slot 5a.

When the driver operates the starting switch and stops the engine, the starting engine is arranged at the OFF position. When the driver moves the shift lever to the parking position, the shift lever switch 36 is closed. The microcomputer 32 provides the activation signal to the FET 62e to activate the FET 62e, activate the solenoid 91, and disengage the plunger 94 from the engaging groove 21b. In this state, the lock release detection switch 39 is deactivated and the microcomputer 32 is provided with the lock detection signal that has a low level. In response to the lock detection signal, the microcomputer 32 rotates the first shaft 24 of the motor 23 in the reverse direction and locks the steering shaft 5 and the steering wheel (not shown) with the lock pin 21. In this state, the lock position detection switch 38 is activated, and the microcomputer 32 is provided with the motor stopping signal. In response to the motor stopping signal, the microcomputer 32 deactivates the FETs 62c–62e to stop driving the motor 23 and stop supplying power to the solenoid 91.

The electronic steering wheel lock 200 of the second embodiment has the advantages described below.

(1) The shift lever switch 36 is closed when the shift lever is located at the parking position. Thus, when the shift lever is located at the parking position, the activation of the solenoid 91 is enabled. When the automobile is being driven and the microcomputer 32 provides the FET 62e with the activation signal, the solenoid 91 is not activated. Accordingly, the reliability of the electronic steering wheel low is improved.

(2) The microcomputer 32 stops driving the motor 23 in accordance with the opened state of the lock position detection switch 38 and the lock release detection switch 39. That is, the microcomputer 32 feedback controls the driving of the motor 23. Thus, the motor 23 is not continuously driven when the lock pin 21 and the slot 5a are engaged or disengaged. Accordingly, the load applied to the motor 23 is decreased and the life of the motor 23 is prolonged.

An electronic steering wheel lock 300 according to a third embodiment of the present invention will now be discussed with reference to FIGS. 9 and 10. In lieu of the mechanical switch 96, the electronic steering wheel lock 300 of the third embodiment includes an n-channel power MOSFET 41, which serves as an electric switching device, and an activation signal generation circuit E3, which generates an activation signal of the FET 41.

Figure 9:
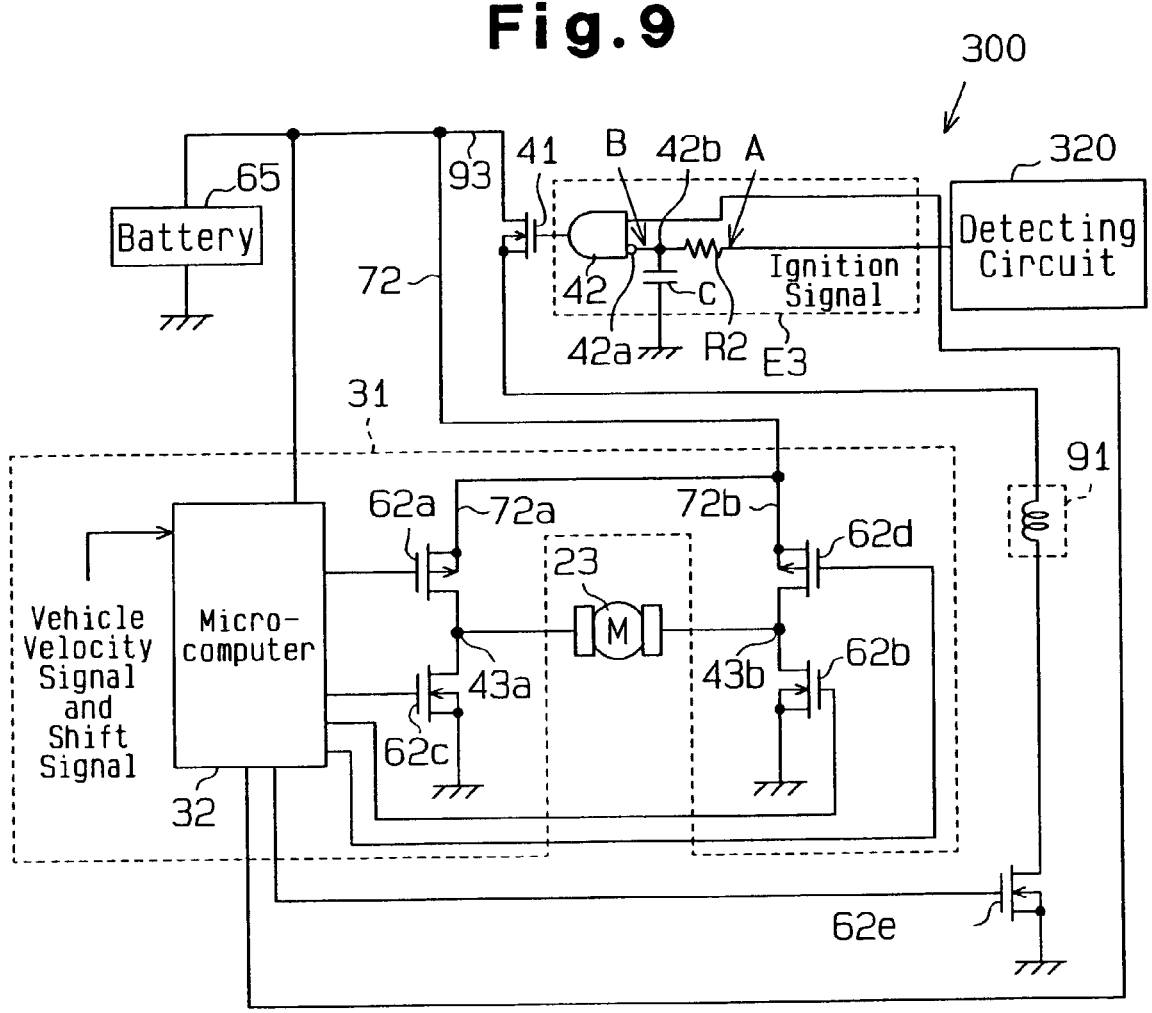
FIG. 9 is a circuit diagram of an electronic steering wheel lock according to a third embodiment of the present invention.
Figure 10:
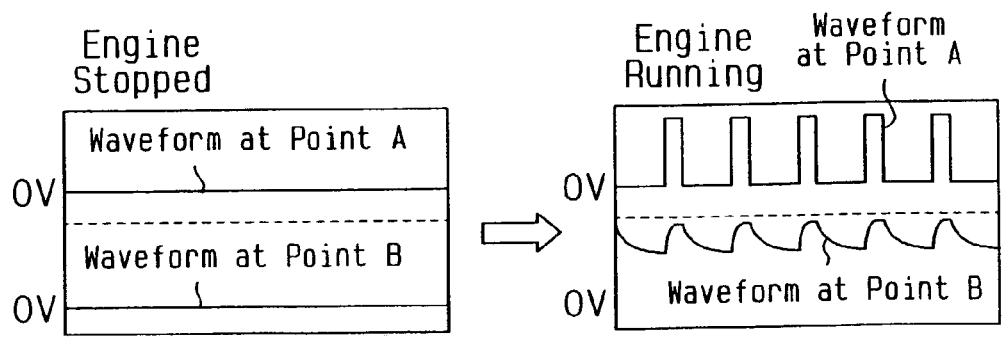
FIG. 10 is a waveform diagram of an ignition signal provided to an AND circuit incorporated in the electronic steering wheel lock of FIG. 9.

Referring to FIG. 9, the FET 41 is connected between the battery 65 and the solenoid 91. The gate of the FET 41 is connected to the activation signal generation circuit E3. The activation signal generation circuit E3 includes a resistor R2, a capacitor C, an inverter 42a, and an AND circuit 42.

The AND circuit 42 has a first input terminal, which is connected to a detection circuit via the inverter 42a and the resistor R2, a second input terminal connected to the microcomputer 32, and an output terminal connected to the gate of the FET 41. The detection circuit 320, which is incorporated in the engine (not shown), generates an ignition signal. The capacitor C is connected between the ground and a node 42b, which is located between the resistor R2 and the first input terminal of the AND circuit 42. The resistor R2 and the capacitor C form an RC circuit.

The AND circuit 42 generates the activation signal at a high level to activate the FET 41 when provided-with a high drive permission signal from the microcomputer and a low ignition signal from the generation circuit E3. As a result, current flows through the interlock power supply line 93.

Before the ignition signal is input to the RC circuit (i.e., the signal at the point indicated by arrow A in FIG. 9), the ignition signal has a low and flat waveform when the engine is not running and a pulse waveform when the engine is running. The ignition signal integrated by the RC circuit (i.e., the signal at the point indicated by arrow B in FIG. 9) has a low and flat waveform when the engine is not running and a generally high waveform when the engine is running. Thus, the AND circuit 42 generates the activation signal to activate the FET 41 only if provided with the drive permission signal from the microcomputer 32 when the engine is not running. In the second embodiment, a breaking means, which is defined by the FET 41 and the activation signal generation circuit E3, breaks the interlock power supply line 93 when the engine is running and supplies power through the interlock power supply line 93 when the engine is not running.

The electronic steering wheel lock 300 of the third embodiment has the advantages described below.

(1) The AND circuit 42 provides the FET 41 with the activation signal only when the AND circuit 42 receives the drive permission signal from the microcomputer 32. Thus, the activation of the solenoid 91 is prohibited even if the AND circuit 42 is provided with the drive permission signal from the microcomputer 32 and the FET 62e is provided with the high control signal when the automobile is being driven. As a result, unintentional operations of the electronic steering wheel lock 1 caused by noise is prevented.

(2) The driven state of the engine is detected through the ignition signal. Further, unintentional operation of the solenoid 91 is prevented when the engine is running.

Figure 11:
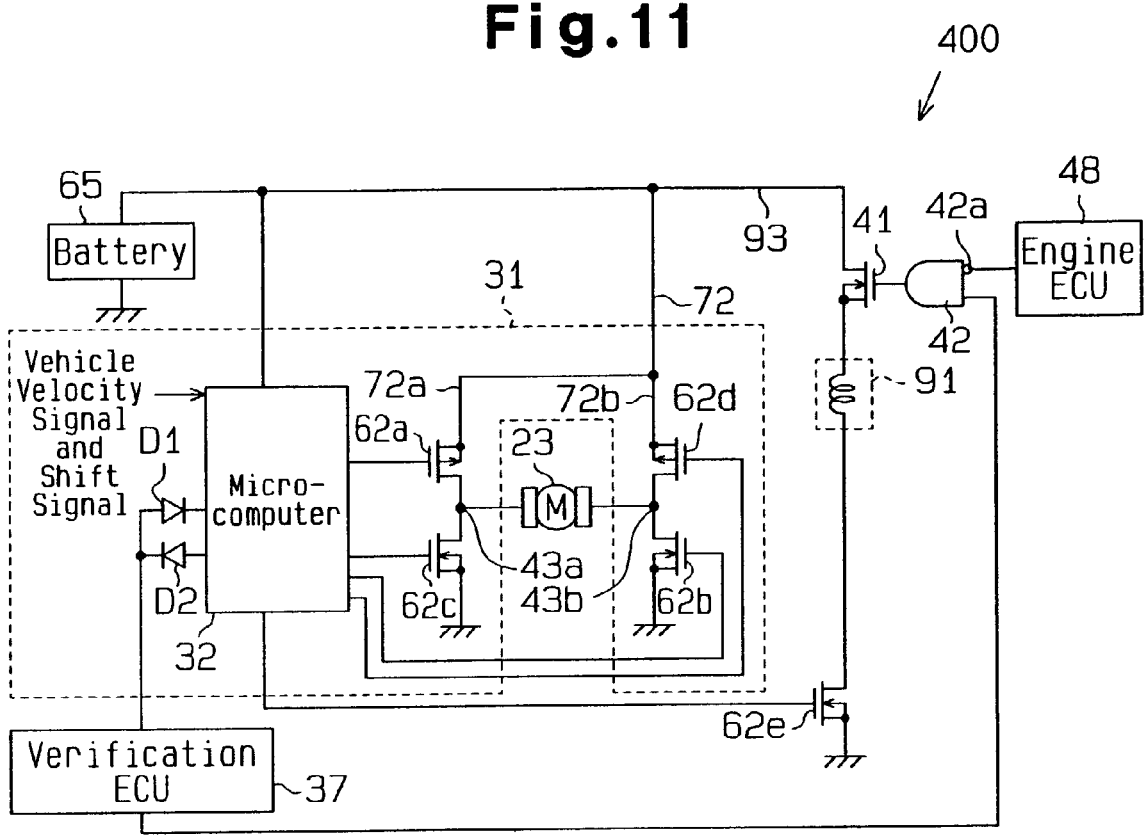
FIG. 11 is a circuit diagram of an electronic steering wheel lock according to a fourth embodiment of the present invention.

An electronic steering wheel lock 400 according to a fourth embodiment of the present invention will now be discussed with reference to FIG. 11. In the fourth embodiment, a FET 41, which serves as a switching device and operates in accordance with an output signal from a verification ECU 37 and an engine ECU 48, is used in lieu of the mechanical switch 96.

The verification ECU 37 is connected to the microcomputer 32 via a pair of diodes D1, D2. More specifically, the verification ECU 37 is connected to the anode terminal of the diode D1 and the cathode terminal of the diode D2. The cathode terminal of the diode D1 and the anode terminal of the diode D2 are connected to the microcomputer 32. The verification ECU 37 communicates with the portable device (not shown) and compares the ID code of the portable device with the ID code of the microcomputer 32. When the two ID codes coincide with each other, the verification ECU 37 provides the microcomputer 32 with an encoded drive request signal, which includes a lock release code. When the two ID codes do not coincide with each other, the verification ECU 37 provides the microcomputer 32 with a drive request signal that does not include the lock code. The microcomputer 32 receives the drive request signal from the verification ECU via a diode D1 and provides the drive request signal to the FETs 62a, 62b in accordance with the drive request signal.

The verification ECU 37 is connected to a first input terminal of the AND circuit 42, and a second input terminal of the AND circuit 42 is connected to the engine ECU 48 via an inverter 42a. The output terminal of the AND circuit 42 is connected to the gate of the FET 41. When the AND circuit 42 receives a low engine starting signal, which indicates that the engine has not been started, from the engine ECU 48 and a high code coinciding signal from the verification ECU 37, the AND circuit 42 activates the FET 41 to provide power through the interlock power supply line 93. When the AND circuit 42 receives a high engine starting signal, which indicates that the engine may be started, from the engine ECU 48 and a high or low code coinciding signal from the verification ECU 37, the AND circuit 42 inactivates the FET 41 to break the interlock power supply line 93.

In the fourth embodiment, another type of ECU such as a transmission ECU may be used instead of the verification ECU 37 or the engine ECU 48.

The electronic steering wheel lock 400 of the fourth embodiment has the advantage described below.

In addition to the activation signal from the microcomputer 32, the activation of the solenoid 91 is controlled in accordance with a signal provided from the verification ECU 37 and the engine ECU 48. Thus, the possibility of the electronic steering wheel lock 400 operating in an unintentional manner is extremely low. This improves the reliability of the electronic steering wheel lock 400.

Figure 12:
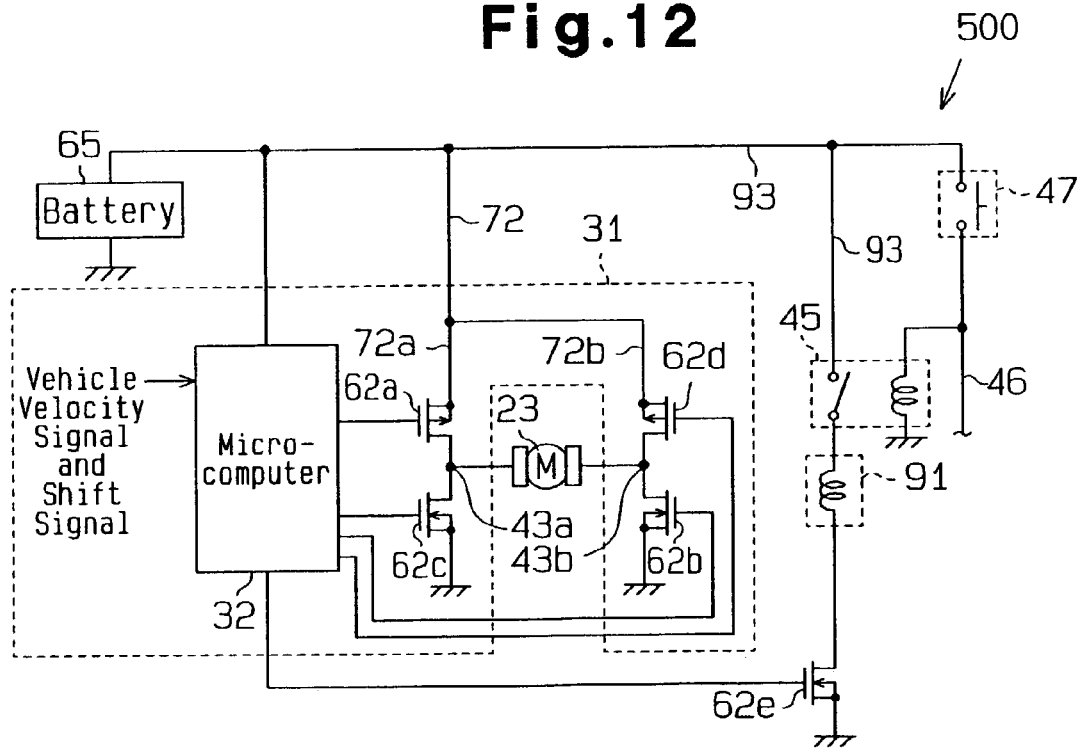
FIG. 12 is a circuit diagram of an electronic steering wheel lock according to a fifth embodiment of the present invention.

An electronic steering wheel lock 500 according to a fifth embodiment of the present invention will now be discussed with reference to FIG. 12. In the fifth embodiment, a breaking means, which includes an ignition switch 47 and a relay 45, are used in lieu of the mechanical switch 96. The ignition switch 47 is a contact holding switch and is activated so that the automobile enters a state that is the same as functional position "ON". The relay 45 breaks the interlock power supply line 93 when the driver activates the ignition switch 47 and the functional position of the automobile is in the "ON" state. When the functional position is in the ON state, power is supplied to an electronic fuel injection controller and other electric components, and the starting of the engine is enabled.

The relay 45 includes a contact connected between the battery 65 and the solenoid 91 and a coil connected between the ignition switch 47 and the ground. The contact of the relay 45 is a B contact (normal close). When the ignition switch 47 closes, the coil is excited and the contact is opened in the relay 45. This breaks the interlock power supply line 93.

In the fifth embodiment, an ignition switch that starts and stops the engine may be used in lieu of the ignition switch 47, which is used to shift the functional position to the "ON" state. Further, non-contact switches, such as the FET 41 or a power transistor, may be used in lieu of the contact switching devices such as the relay 45.

The electronic steering wheel lock 500 of the fifth embodiment has the advantages described below.

When the ignition switch 47 is activated, the interlock power supply line 93 is broken to maintain the steering shaft 5 in an unlocked state. That is, when the automobile is in a state in which it may be driven, the steering shaft 5 remains unlocked even if the ECU 31 operates in an unintentional manner. This improves the reliability of the electronic steering wheel lock 1.

It should be apparent to those skilled in the art that the present invention may be embodied in many other specific forms without departing from the spirit or scope of the invention. Particularly, it should be understood that the present invention may be embodied in the following forms.

In the first embodiment, the movable piece 74 may be moved by the distal end of a key or a key plate instead of the rod 73 of the ignition switch 92 to selectively break the interlock power supply line 93.

In the first embodiment, the mechanical switch 96 may be connected between the solenoid 91 and the ground, and the FET 62e may be connected between the battery 65 and the solenoid 91.

The lock position detection circuit E1 and the lock release detection circuit E2 may be employed in the third embodiment.

Figure 13:
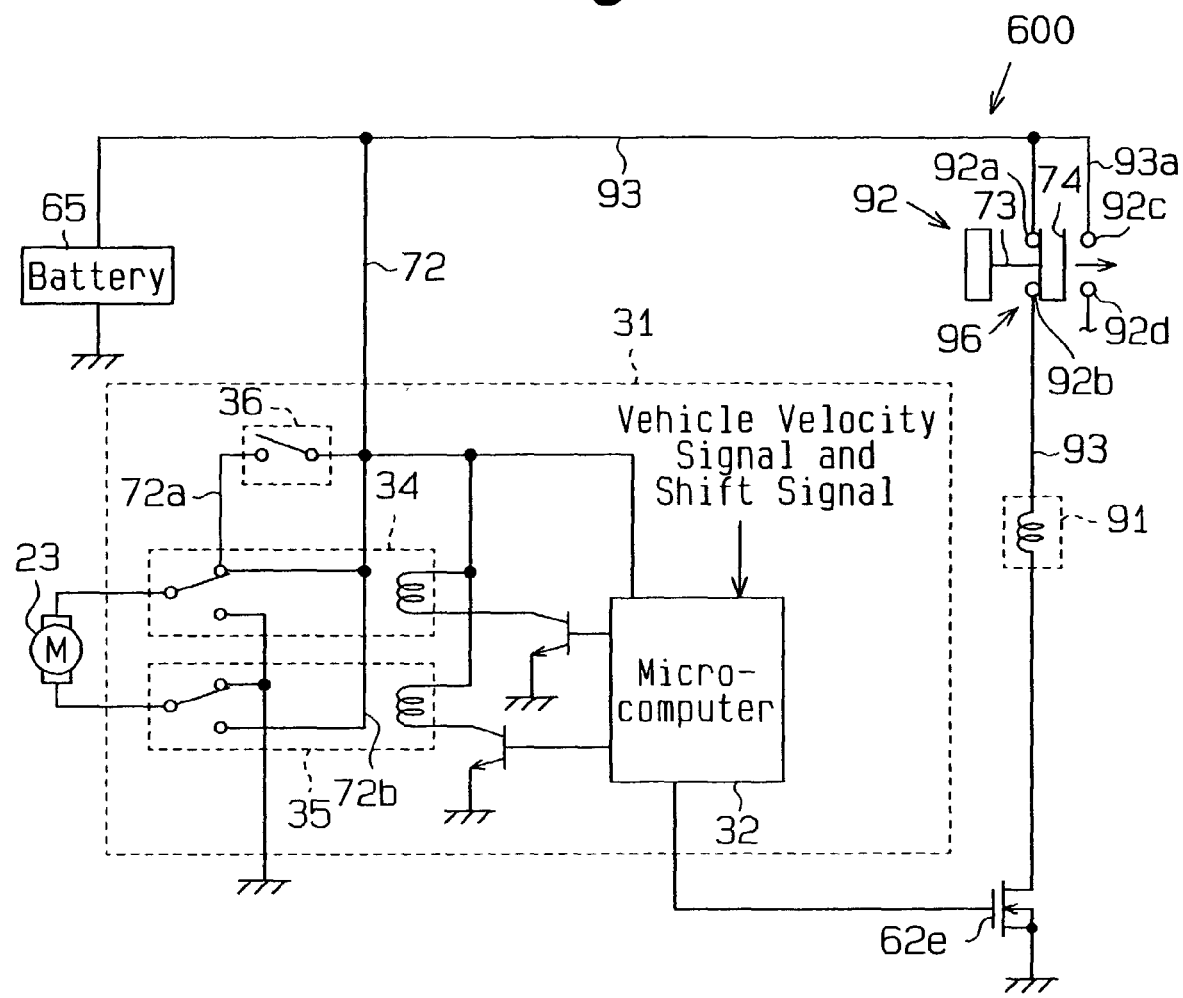
FIG. 13 is a circuit diagram showing a modified example of the electronic steering wheel lock of the first embodiment.

Referring to FIG. 13, in the first to fifth embodiments, the relays 34, 35 may be used in lieu of the FETs 62a–62c. In this case, when the motor 23 rotates its first shaft 24 in the forward direction, current flows from the battery 65 to the relay 34, the motor 23, and the relay 35. When the motor 23 rotates its first shaft 24 in the reverse direction, current flows from the battery 65 to the relay 35, the motor 23, and the relay 34.

In the first embodiment, a key cooperation switch may be used in lieu of the ignition switch 92 to break the interlock power supply line 93 when a key is inserted in a key cylinder.

In the second embodiment, a key cooperation switch may be connected parallel to the lock position detection switch 38. The key cooperation switch breaks the interlock power supply line when the starting of the engine is enabled.

In the second embodiment, a reed switch may be used in lieu of the limit switch as the lock position detection switch 38 and the lock release detection switch 39.

In the third embodiment, instead of the ignition signal, the FET 41 may be activated and inactivated in response to a signal indicating the driving state of the engine, such as a vehicle velocity detection signal or an alternator output signal.

In the third embodiment, the output terminal of the AND circuit 42 in the activation signal generation circuit E3 may be connected to the gate of the FET 62*e*.

In the first to fifth embodiments, bipolar transistors or ICs may be used in lieu of the FETs 62*a*–62*e*.

In the first to fifth embodiments, an actuator, such as a solenoid or an air cylinder, may be used in lieu of the motor 23. Further, an actuator, such as a motor or an air cylinder, may be used in lieu of the solenoid 91.

In the first to fifth embodiments, an electronic key having an IC chip may be used in lieu of the portable device. In this case, the electronic key has a transponder that receives a transmission signal from the vehicle when the key is inserted in a key cylinder.

The present invention may be applied to an electronic automobile anti-theft apparatuses, such as an electronic travel restriction apparatus that restricts the rotation of a wheel or an electronic shift lever lock apparatus that restricts the shifting of shift positions.

The present examples and embodiments are to be considered as illustrative and not restrictive, and the invention is not to be limited to the details given herein, but may be modified within the scope and equivalence of the appended claims.

What is claimed is:

1. An electronic automobile anti-theft apparatus comprising:
    a locking means for selectively locking a steering mechanism or a drive mechanism of an automobile;
    a first actuator for operating the locking means;
    a second actuator including a movable member for maintaining the locking means in a lock release state, wherein the movable member engages with the locking means to prevent the locking means from locking the steering mechanism or drive mechanism when the second actuator is deactivated, and wherein the second actuator moves the movable member to disengage with the locking means to permit locking with the locking means when the second actuator is activated;
    a control unit for controlling the operations of the first and second actuators; and
    a breaking means for stopping the supply of power to the second actuator when the automobile is being driven or when driving of the automobile is enabled; wherein the breaking means is not controlled by the control unit.

2. The apparatus according to claim 1, wherein the breaking means includes a mechanical switch that cooperates with an ignition switch of the automobile.

3. The apparatus according to clam 1, wherein the breaking means includes a shift lever switch that cooperates with a shift lever device of the automobile.

4. The apparatus according to claim 3, wherein the shift lever switch stops the supply of power to the second actuator when the shift lever device is located at a position other than a parking position.

5. The apparatus according to claim 3, wherein the shift lever switch permits the supply of power to the second actuator when the shift lever device is located at a parking position.

6. The apparatus according to claim 1, wherein the second actuator includes a solenoid for engaging the locking means to maintain the locking means in the lock release state.

7. The apparatus according to claim 1, wherein the control unit generates a drive permission signal, and wherein the breaking means includes:
    an activation signal generation circuit for receiving an ignition signal and the drive permission signal and generating an activation signal;
    a switching device for pertaining the supply of power to the second actuator in response to the activation signal.

8. The apparatus according to claim 7, wherein the switching device is inactivated to stop supplying the second actuator wit power in response to the activation signal when the ignition signal indicates that an engine of the automobile is running.

9. The apparatus according to claim 7, wherein the switching device is activated to supply the second actuator wit power in response to the activation signal when the drive permission signal is active and the ignition signal indicates that an engine of the automobile is not running.

10. The apparatus according to claim 7, wherein the switching device is connected between a power supply and the second actuator.

11. The apparatus according to claim 1, wherein the breaking means includes:
    an activation signal generation circuit for receiving an engine starring signal and a code coinciding signal and generating an activation signal; and
    a switching device for permitting the supply of power to the second actuator in response to the activation signal.

12. The apparatus according to claim 11, wherein the switching device is inactivated to stop supplying the second actuator with power in response to the activation signal when the engine starring signal is active.

13. The apparatus according to claim 11, wherein the switching device is activated to supply the second actuator with power in response to the activation signal when the engine starting signal is inactive and the code coinciding signal is active.

14. The apparatus according to claim 1, wherein the breaking means includes:
    an ignition switch; and
    a relay for stopping the supply of power to the second actuator when the ignition switch is activated.

* * * * *

UNITED STATES PATENT AND TRADEMARK OFFICE
CERTIFICATE OF CORRECTION

PATENT NO. : 7,145,264 B2
APPLICATION NO. : 10/265048
DATED : December 5, 2006
INVENTOR(S) : Toshihiro Nagae et al.

It is certified that error appears in the above-identified patent and that said Letters Patent is hereby corrected as shown below:

Column 12
Line 1, delete "clam" and insert therefor -- claim --.
Line 20, after "activation signal;", insert -- and --.
Line 21, delete "pertaining" and insert therefor -- permitting --.
Line 25, delete "wit" and insert therefor -- with --.
Line 30, delete "wit" and insert therefor -- with --.
Line 40, delete "starring" and insert therefor -- starting --.
Line 47, delete "starring" and insert therefor -- starting --.

Signed and Sealed this

Twenty-second Day of May, 2007

JON W. DUDAS
*Director of the United States Patent and Trademark Office*